United States Patent
Watanabe

(10) Patent No.: US 8,704,389 B2
(45) Date of Patent: Apr. 22, 2014

(54) POWER GENERATION CONTROL DEVICE AND POWER GENERATION CONTROL METHOD FOR VEHICLE

(75) Inventor: Takeshi Watanabe, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/700,592

(22) PCT Filed: Apr. 22, 2011

(86) PCT No.: PCT/JP2011/059965
§ 371 (c)(1),
(2), (4) Date: Nov. 28, 2012

(87) PCT Pub. No.: WO2011/152152
PCT Pub. Date: Dec. 8, 2011

(65) Prior Publication Data
US 2013/0069367 A1    Mar. 21, 2013

(30) Foreign Application Priority Data
May 31, 2010    (JP) ................................. 2010-124236

(51) Int. Cl.
*B60W 10/00* (2006.01)
(52) U.S. Cl.
USPC ....................................... 290/40 R

(58) Field of Classification Search
CPC ...................................................... B60W 10/10
USPC ....................................................... 290/40 R
See application file for complete search history.

(56) References Cited

U.S. PATENT DOCUMENTS

| | | | |
|---|---|---|---|
| 6,430,482 B1 * | 8/2002 | Wakashiro et al. | 701/22 |
| 7,224,079 B2 * | 5/2007 | Kanazawa et al. | 290/40 B |
| 2003/0034653 A1 * | 2/2003 | Kitajima et al. | 290/40 C |
| 2007/0200346 A1 * | 8/2007 | Kanazawa et al. | 290/40 B |
| 2008/0018111 A1 * | 1/2008 | Yaguchi | 290/40 B |
| 2013/0304292 A1 * | 11/2013 | Moriki et al. | 701/22 |

FOREIGN PATENT DOCUMENTS

| | | | |
|---|---|---|---|
| JP | 63-305797 A | | 12/1988 |
| JP | 8-99564 A | | 4/1996 |
| JP | 2002-345298 A | | 11/2002 |
| JP | 2005-125980 A | | 5/2005 |
| JP | 2005-226656 A | | 8/2005 |
| JP | 2006-240580 A | | 9/2006 |
| JP | 2007-170238 A | | 7/2007 |
| JP | 2009-029319 A | | 2/2009 |
| JP | 2009-063001 A | | 3/2009 |
| JP | 2009063001 A | * | 3/2009 |
| JP | 2010-114960 A | | 5/2010 |
| JP | 2012091581 A | * | 5/2012 |

* cited by examiner

*Primary Examiner* — Joseph Waks
(74) *Attorney, Agent, or Firm* — Foley & Lardner LLP

(57) ABSTRACT

A device that controls a power generator driven by power from an engine includes: a brake operation amount detection unit that detects a brake operation amount; and a power generation amount setting unit that sets a power generation amount of the power generator to be lower when a vehicle is predicted to accelerate in accordance with the brake operation amount.

7 Claims, 13 Drawing Sheets ical field

This invention relates to a power generation control device and a power generation control method for a vehicle.

BACKGROUND ART

A power generator installed in a vehicle is coupled to a crankshaft of an engine via an auxiliary drive belt. When a driver removes his/her foot from an accelerator pedal as the vehicle travels, a fuel supply to the engine is stopped. Accordingly, the vehicle decelerates. Rotation of tires is transmitted to the engine via a drive train, and then transmitted to the power generator via the belt. As a result, the power generator generates power. Thus, kinetic energy that would otherwise be discarded is collected as electric energy. This type of power generation is known as regenerative power generation. With regenerative power generation, power can be generated without consuming fuel, and therefore a fuel efficiency of the vehicle improves.

However, the power generator is coupled to the crankshaft of the engine via the auxiliary drive belt, and therefore a part of an engine output generated in response to depression of the accelerator pedal by the driver is consumed by the power generator. As a result, an acceleration performance of the vehicle deteriorates.

Hence, in JP2007-170238A, a power generation capacity of the power generator is varied in accordance with a travel condition of the vehicle. When the vehicle accelerates, the power generation capacity of the power generator is suppressed by suppressing or stopping an operation of an auxiliary machine. In so doing, a torque for driving the power generator is suppressed, and therefore the acceleration performance of the vehicle does not deteriorate.

SUMMARY OF THE INVENTION

In JP2007-170238A, however, an acceleration of the vehicle is detected on the basis of an output of an acceleration sensor or an amount of vehicle speed variation. The operation of the auxiliary machine is then controlled on the basis of the acceleration. With this method, it is impossible to respond to rapid variation in the torque for driving the power generator. Therefore, if the accelerator pedal is depressed rapidly during regenerative power generation while the vehicle decelerates, a rapid acceleration torque overlaps the torque for driving the power generator. As a result, an extremely large torque is exerted on the belt.

This phenomenon occurs particularly strikingly when a power generator having a large power generation capacity is used. More specifically, a power generation amount increases with increases in the power generation capacity of the power generator, leading to an increase in the torque for driving the power generator. When the rapid acceleration torque is overlapped onto this torque, an extremely large torque is exerted on the belt as a result.

When this extremely large torque is exerted on the belt, the belt becomes more likely to slip and more likely to squeak.

When, as a countermeasure, a tension of the belt is simply increased, the fuel efficiency of the vehicle deteriorates. Moreover, a strength of the belt must also be increased.

This invention has been designed with a focus on these conventional problems, and an object thereof is to provide a power generation control device and a power generation control method for a vehicle with which a power generator having a large power generation capacity can be used without strengthening an auxiliary belt, leading to an improvement in a fuel efficiency of the vehicle.

This invention solves the problems described above using following solving means.

A device that controls a power generator driven by a power of an engine according to this invention includes: a brake operation amount detection unit that detects a brake operation amount; and a power generation amount setting unit that sets a power generation amount of the power generator to be lower when the vehicle is predicted to accelerate in accordance with the brake operation amount.

Embodiments and advantages of this invention will be described in further detail below with reference to the attached figures.

EMBODIMENTS OF THE INVENTION

Embodiments of this invention will be described below with reference to the figures and so on.

(First Embodiment)

Figure 1:
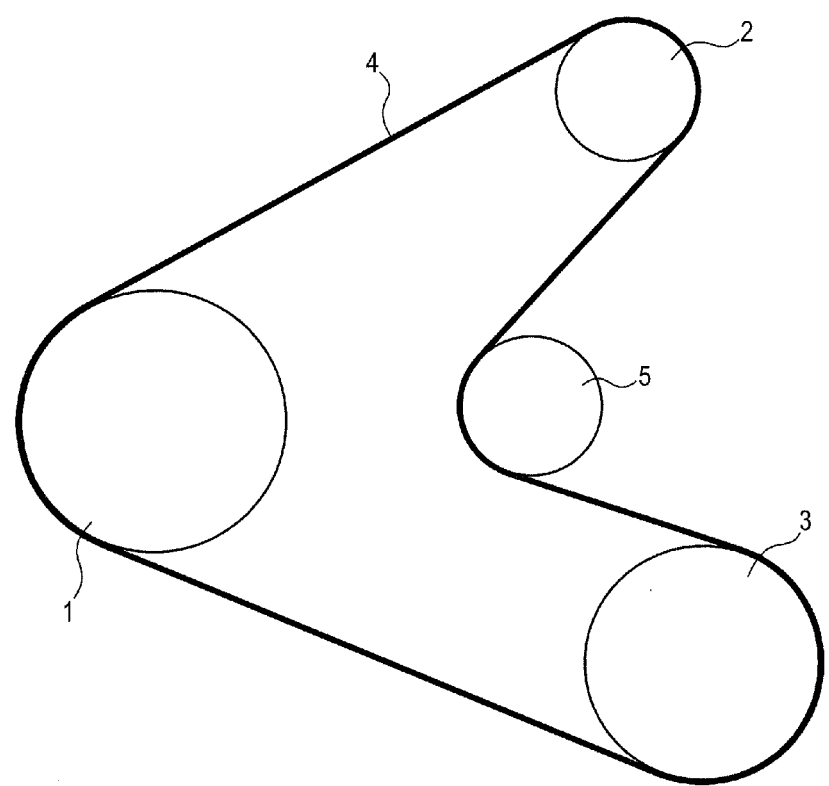
FIG. 1 is a view showing an engagement relationship between an engine and auxiliary machines to which a power generation control device for a vehicle according to this invention is applied.

FIG. 1 is a pattern diagram showing an arrangement relationship between an engine and auxiliary machines to which a power generation control device for a vehicle according to this invention is applied.

An engine pulley 1 is provided on a crankshaft end portion. A groove that meshes with an auxiliary belt 4 is formed in an outer periphery of the engine pulley 1.

A power generator pulley 2 is provided on a rotary shaft of a power generator. A groove that meshes with the auxiliary belt 4 is formed in an outer periphery of the power generator pulley 2. The power generator pulley 2 transmits rotation of the engine to the rotary shaft of the power generator. The rotary shaft of the power generator, which includes a magnetized rotor coil, rotates such that electromotive force is generated in a stator coil, and as a result, power is generated.

An air conditioner pulley 3 is provided on a rotary shaft of an air conditioner compressor. A groove that meshes with the auxiliary belt 4 is formed in an outer periphery of the air conditioner pulley 3. The air conditioner pulley 3 transmits the rotation of the engine to the rotary shaft of the air conditioner compressor. The rotary shaft of the air conditioner compressor rotates such that a refrigerant gas is compressed, and as a result, cooling control is performed.

The auxiliary belt 4 is wound around auxiliary pulleys (here, the power generator pulley 2 and the air conditioner pulley 3) driven by a part of a motive force of the engine, the engine pulley 1, and an idler pulley 5. The auxiliary belt 4 transmits the rotation of the engine to the auxiliary machines.

The idler pulley 5 is provided in the engine so as to spin. The idler pulley 5 is provided across a part of the auxiliary belt 4 between the power generator pulley 2 and the air conditioner pulley 3. The idler pulley 5 is provided to increase a winding angle by which the auxiliary belt 4 is wound around the auxiliary machines and to vary a direction of the auxiliary belt 4 in order to circumvent obstructions.

Figure 2:
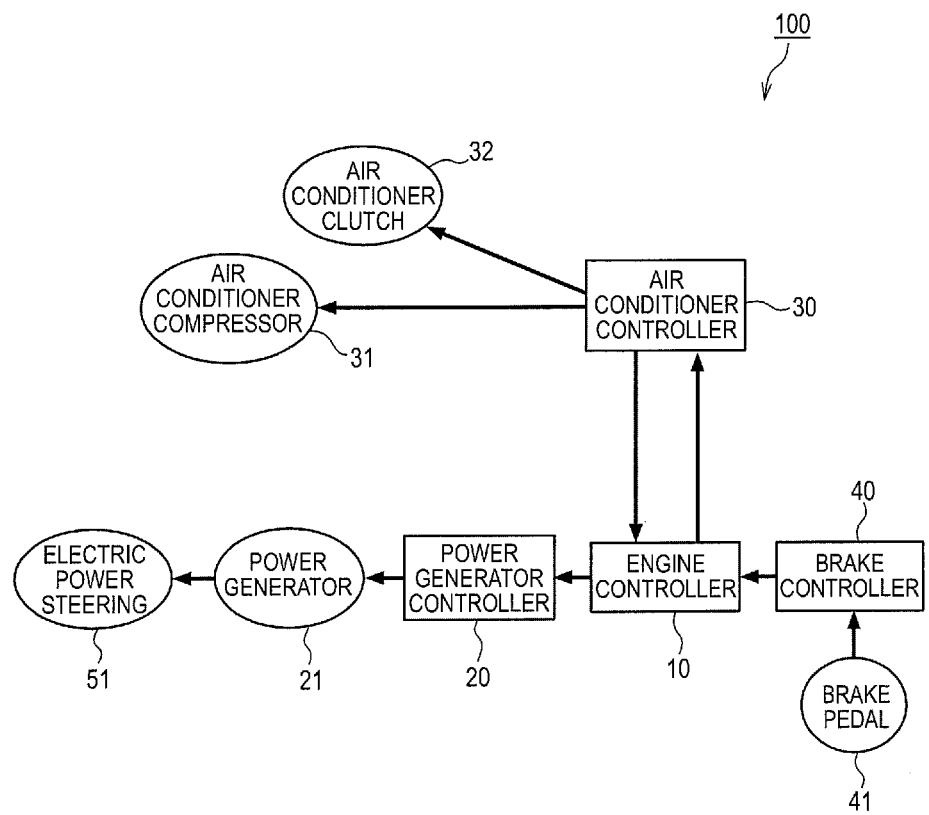
FIG. 2 shows an example of an overall system to which the power generation control device for a vehicle according to this invention is applied.

FIG. 2 shows an example of an overall system to which the power generation control device for a vehicle according to this invention is applied.

A power generation control device 100 for a vehicle includes an engine controller 10, a power generator controller 20, an air conditioner controller 30, and a brake controller 40. These controllers include a central processing unit (CPU), a read-only memory (ROM), a random access memory (RAM), and an input/output interface (I/O interface). Further, the engine controller 10, the power generator controller 20, the air conditioner controller 30, and the brake controller 40 are illustrated separately in this embodiment, but may be constituted by a single controller.

The engine controller 10 receives an air conditioner torque value transmitted from the air conditioner controller 30. The engine controller 10 also receives brake fluid pressure information transmitted from the brake controller 40. On the basis of the received information, the engine controller 10 issues a command to the power generator controller 20 indicating a power generation amount to be generated by the power generator. Further, the engine controller 10 issues an ON/OFF command for an air conditioner clutch 32 to the air conditioner controller 30. Furthermore, the engine controller 10 receives an air conditioner torque value relating to an air conditioner compressor 31 and performs feedback control thereon.

The power generator controller 20 controls a power generator 21 to generate the power generation amount commanded by the engine controller 10. The power generator 21 supplies power to an electric power steering 51.

The air conditioner controller 30 transmits the air conditioner torque value to the engine controller 10. Further, the air conditioner controller 30 switches the air conditioner clutch 32 ON/OFF in response to the command from the engine controller 10. Moreover, the engine controller 10 drives the air conditioner compressor 31 such that a set air conditioner torque value is realized.

The brake controller 40 transmits information relating to a brake fluid pressure generated when a driver depresses a brake pedal 41 to the engine controller 10.

Specific control logic of the power generation control device 100 for a vehicle according to the first embodiment will be described below using a flowchart.

Figure 3:
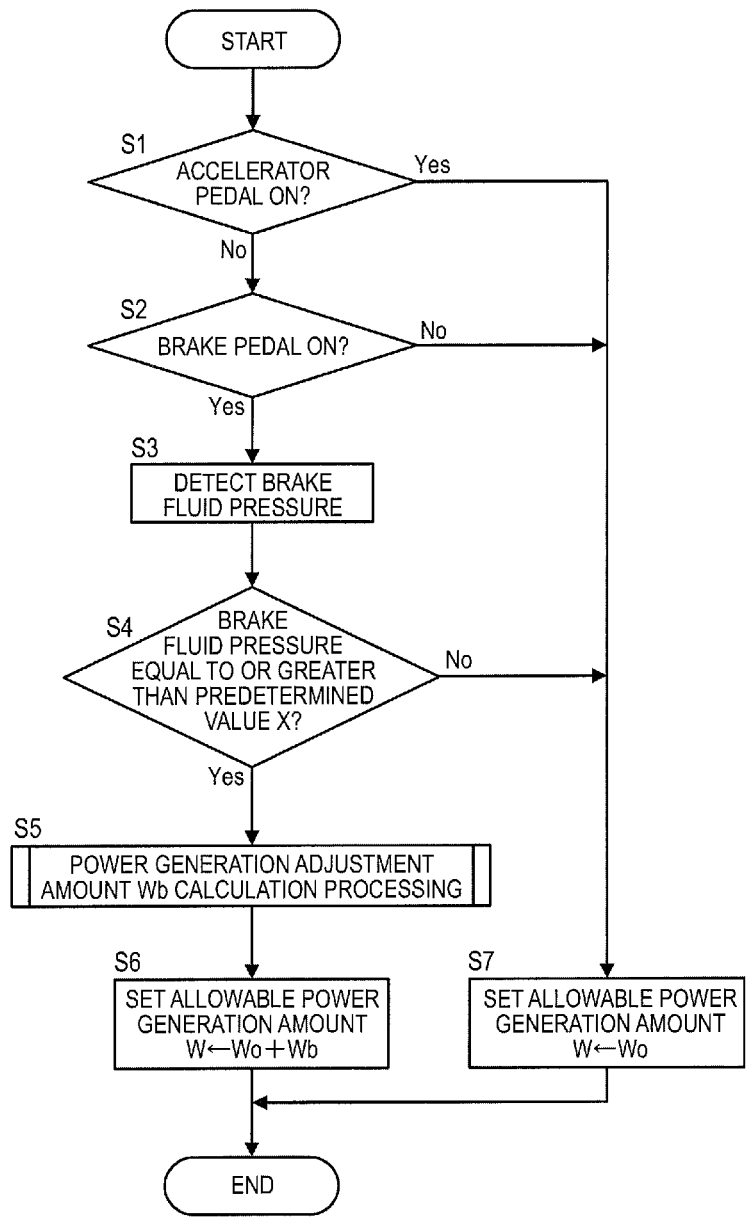
FIG. 3 is a flowchart illustrating an operation of a power generation control device for a vehicle according to a first embodiment.

FIG. 3 is a flowchart illustrating an operation of the power generation control device for a vehicle according to this embodiment.

It should be noted that the power generation control device 100 for a vehicle executes this processing repeatedly in cycles of a very small time period (10 milliseconds, for example).

In a step S1, the power generation control device 100 for a vehicle determines whether or not an accelerator pedal is depressed. When the accelerator pedal is not depressed, the power generation control device 100 for a vehicle advances the processing to a step S2. When the accelerator pedal is depressed, the power generation control device 100 for a vehicle advances the processing to a step S7.

In the step S2, the power generation control device 100 for a vehicle determines whether or not the brake pedal is depressed. When the brake pedal is depressed, the power generation control device 100 for a vehicle advances the processing to a step S3. When the brake pedal is not depressed, the power generation control device 100 for a vehicle advances the processing to the step S7.

In the step S3, the power generation control device 100 for a vehicle detects the brake fluid pressure.

In a step S4, the power generation control device 100 for a vehicle determines whether or not the brake fluid pressure equals or exceeds a predetermined value X. When the brake fluid pressure equals or exceeds the predetermined value X, the power generation control device 100 for a vehicle advances the processing to a step S5. When the brake fluid pressure is smaller than the predetermined value X, the power generation control device 100 for a vehicle advances to the processing to the step S7.

Here, the predetermined value X is a brake fluid pressure threshold for determining that the driver intends to decelerate the vehicle. When the brake pedal is depressed but a depression amount is small, the accelerator pedal may be depressed immediately thereafter. Hence, when the brake pedal has been depressed greatly such that the brake fluid pressure equals or exceeds the predetermined value X, the power generation control device 100 for a vehicle determines that the driver intends to decelerate the vehicle and that deceleration of the vehicle will be maintained.

In the step S5, the power generation control device 100 for a vehicle calculates a power generation adjustment amount Wb of the power generator 21. This will be described in detail below.

In a step S6, the power generation control device 100 for a vehicle sets a value obtained by adding the power generation adjustment amount Wb to a basic power generation amount Wo as an allowable power generation amount W of the power generator 21.

In the step S7, the power generation control device 100 for a vehicle sets the basic power generation amount Wo as the allowable power generation amount W of the power generator 21.

Here, the basic power generation amount Wo is a basic power generation amount value at which an acceleration performance of the vehicle is not impaired.

Figure 4:
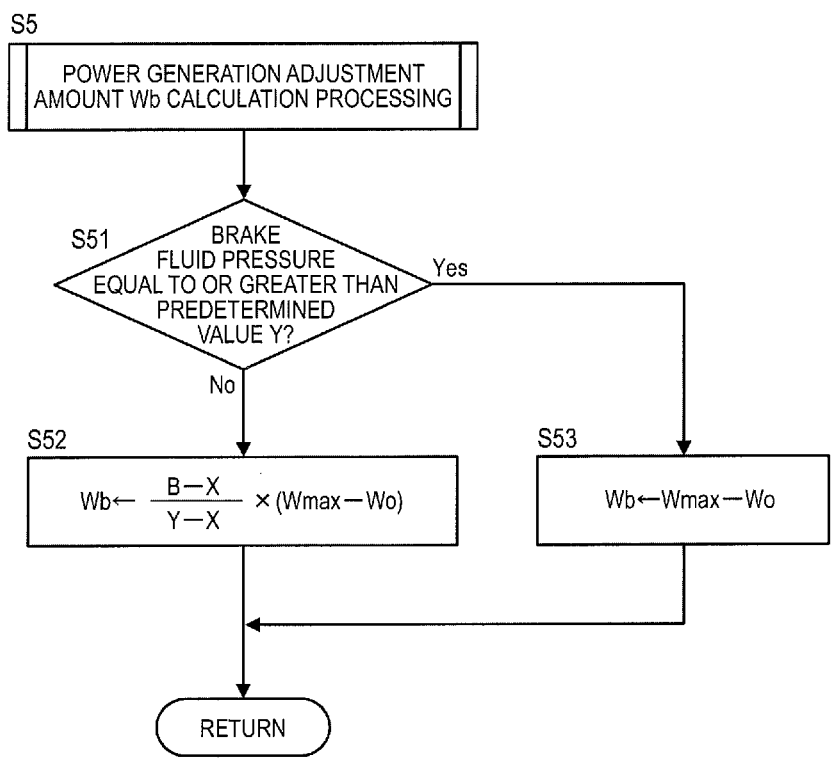
FIG. 4 is a flowchart illustrating a processing operation for calculating a power generation adjustment amount Wb according to the first embodiment.

FIG. 4 is a flowchart illustrating a processing operation for calculating the power generation adjustment amount Wb according to this embodiment.

Next, referring to FIG. 4, processing for calculating the power generation adjustment amount Wb in the step S5 will be described.

In a step S51, the power generation control device 100 for a vehicle determines whether or not the brake fluid pressure equals or exceeds a predetermined value Y. When the brake fluid pressure is smaller than the predetermined value Y, the power generation control device 100 for a vehicle advances the processing to a step S52. When the brake fluid pressure equals or exceeds the predetermined value Y, the power generation control device 100 for a vehicle advances the processing to a step S53.

Here, the predetermined value Y is larger than the predetermined value X. When the brake fluid pressure equals or exceeds the predetermined value Y, the allowable power generation amount of the power generator 21 reaches a maximum power generation amount Wmax. In other words, the predetermined value Y is a minimum brake fluid pressure value when the allowable power generation amount of the power generator 21 is at the maximum power generation amount Wmax.

In the step S52, the power generation control device 100 for a vehicle calculates the power generation adjustment amount Wb using a following Equation (1). Here, B is the brake fluid pressure detected in the step S3.

[Equation 1]

$$Wb = \frac{B - X}{Y - X} \times (Wmax - Wo) \quad (1)$$

In the step S53, the power generation control device 100 for a vehicle calculates the power generation adjustment amount Wb using a following Equation (2).

[Equation 2]

$$Wb = Wmax - Wo \quad (2)$$

Figure 5:
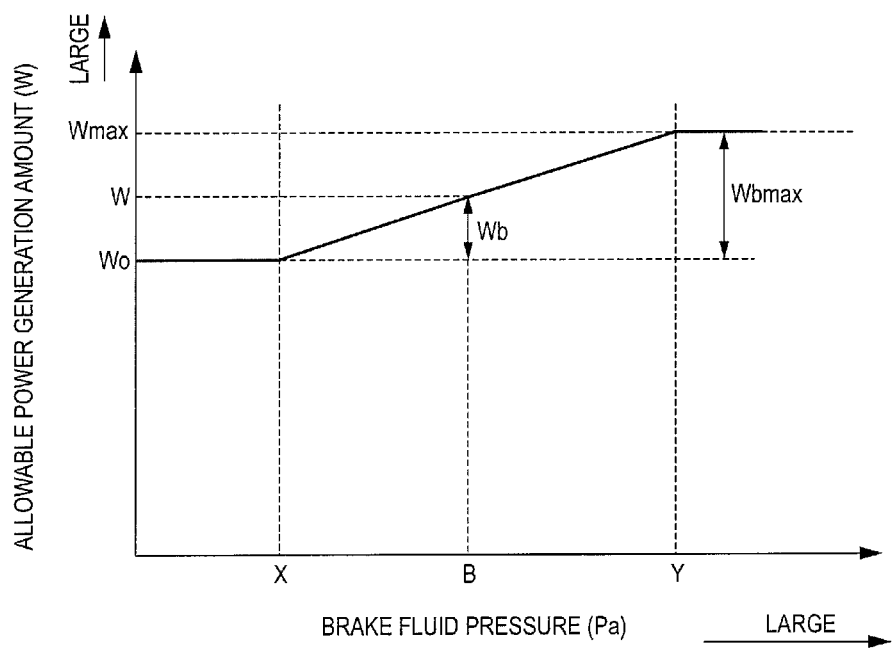
FIG. 5 is a view showing a relationship between a brake fluid pressure and an allowable power generation amount according to the first embodiment.

FIG. 5 is a view showing a relationship between the brake fluid pressure and the allowable power generation amount according to this embodiment. An abscissa in FIG. 5 shows the brake fluid pressure, and an ordinate shows the allowable power generation amount. In this embodiment, the allowable power generation amount can be determined by applying the brake fluid pressure detected in the step S3 to the relationship diagram shown in FIG. 5. In other words, Equations (1) and (2) are determined from FIG. 5. A clear correspondence to the flowcharts exists, and therefore the step numbers of the flowcharts are added to the description.

When the brake fluid pressure is smaller than the predetermined value X, the allowable power generation amount is set at the basic power generation amount Wo (No in S4→S7).

When the brake fluid pressure is equal to or greater than the predetermined value X but smaller than the predetermined value Y, the allowable power generation amount is set in accordance with the brake fluid pressure (Yes in S4→No in S51→S52→S6). At this time, the allowable power generation amount increases as the brake fluid pressure increases.

When the brake fluid pressure is equal to or greater than the predetermined value Y, the allowable power generation amount is set at the maximum power generation amount Wmax (Yes in S4→Yes in S51→S53→S6). The power generation adjustment amount Wb at this time corresponds to a maximum power generation adjustment amount Wbmax. The maximum power generation adjustment amount Wbmax takes a value obtained by subtracting the basic power generation amount Wo from the maximum power generation amount Wmax.

Figure 6:
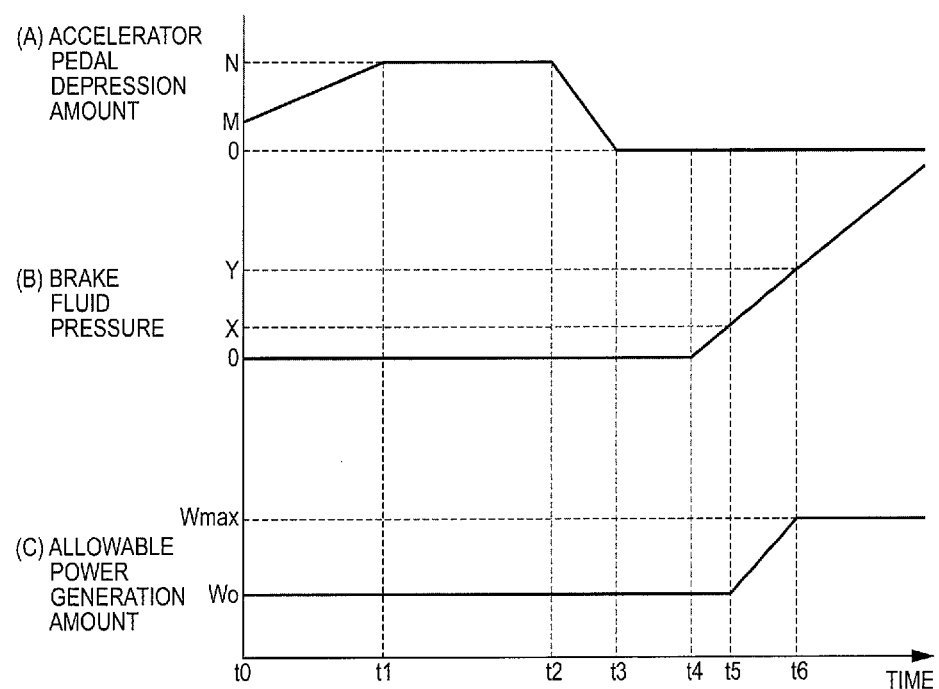
FIG. 6 is a time chart illustrating the operation of the power generation control device for a vehicle according to the first embodiment.

Next, referring to FIG. 6, an operation of this embodiment will be described. FIG. 6 is a time chart illustrating the operation of the power generation control device for a vehicle according to this embodiment.

From a time t0 to a time t1, the accelerator pedal is depressed such that an accelerator pedal depression amount shifts from M to N (FIG. 6A). As a result, the vehicle accelerates. Since the accelerator pedal is depressed, the brake pedal is not depressed, and therefore the brake fluid pressure is zero (FIG. 6B). At this time, the processing of S1→S7 is repeated such that the allowable power generation amount of the power generator 21 is maintained at the basic power generation amount Wo (FIG. 6C).

From the time t1 to a time t2, the accelerator pedal depression amount remains constant at N (FIG. 6A). Accordingly, the vehicle travels at a constant speed. Likewise at this time, the processing of S1→S7 is repeated such that the allowable power generation amount of the power generator 21 is maintained at the basic power generation amount Wo (FIG. 6C).

From the time t2 to a time t3, the accelerator pedal depression amount gradually decreases (FIG. 6A). Accordingly, the vehicle gradually decelerates, but since the accelerator remains depressed, acceleration may be performed again. Likewise at this time, the processing of S1→S7 is repeated such that the allowable power generation amount of the power generator 21 is maintained at the basic power generation amount Wo (FIG. 6C).

At the time t3, the accelerator pedal depression amount reaches zero. From the time t3 to a time t4, neither the accelerator pedal nor the brake pedal 41 is depressed (FIGS. 6A and 6B). The vehicle gradually decelerates, but since the brake pedal 41 is not depressed, acceleration may be performed again. At this time, the processing of S1→S2→S7 is repeated such that the allowable power generation amount of the power generator 21 is maintained at the basic power generation amount Wo (FIG. 6C).

At the time t4, the brake pedal 41 is depressed and gradually depressed further (FIG. 6B). Accordingly, the vehicle is decelerated further by an action of a braking force generated by the brake. However, the amount by which the brake pedal is depressed by the driver is not large, and it is therefore impossible to determine whether or not the driver intends to decelerate the vehicle. Hence, the possibility that the accelerator pedal will be depressed again immediately thereafter remains. At this time, the processing of S1→S2→S3→S4→S7 is repeated such that the allowable power generation amount of the power generator 21 is maintained at the basic power generation amount Wo (FIG. 6C).

At a time t5, the brake fluid pressure reaches the predetermined value X. Further, from the time t5 onward, the brake fluid pressure continues to increase (FIG. 6B). As a result, the vehicle decelerates further. Since the brake fluid pressure is greater than the predetermined value X, it is determined that the driver intends to decelerate. At this time, the processing of S1→S2→S3→S4→S51→S52→S6 is repeated such that the allowable power generation amount of the power generator 21 increases in accordance with the brake fluid pressure (FIG. 6C).

At a time t6, the brake fluid pressure reaches the predetermined value Y. Further, from the time t6 onward, the brake fluid pressure continues to increase (FIG. 6B). As a result, the vehicle continues to decelerate. At this time, the processing of S1→S3→S4→S51→S53→S6 is repeated, whereby the allowable power generation amount of the power generator 21 is set at the maximum power generation amount Wmax (FIG. 6C). The allowable power generation amount remains unchanged even when the brake fluid pressure exceeds the predetermined value Y.

The inventors of this specification investigated methods of collecting a maximum amount of regenerative power generation energy using a power generator having a large power generation capacity. When a power generator having a large power generation capacity is used, a torque for driving the power generator also increases. Therefore, if the accelerator pedal is depressed rapidly during regenerative power generation while the vehicle decelerates, an extremely large torque acts on the belt. As a result, the belt becomes more likely to slip and more likely to squeak. When a tension and a strength of an auxiliary drive belt are set in order to prevent this situation, the auxiliary drive belt becomes extremely expensive.

Hence, in this embodiment, when the brake fluid pressure is smaller than the predetermined value X, it is determined that the vehicle may be accelerated again, and therefore the allowable power generation amount is set at the basic power generation amount Wo. By setting the allowable power generation amount at a smaller value in this manner, belt slippage and squeaking can be prevented without increasing the tension and strength of the belt, even when the power generator 21 having a large power generation capacity is used.

Further, when the brake fluid pressure equals or exceeds the predetermined value X, it is determined that deceleration of the vehicle will be maintained. Accordingly, the allowable power generation amount of the power generator 21 is set in accordance with the brake fluid pressure. As the brake fluid pressure increases, the likelihood that the driver wishes to decelerate and does not intend to accelerate increases. When the vehicle does not accelerate, the engine does not reach a high load. Therefore, a load is not exerted on the belt even when the power generation amount of the power generator 21 increases. As a result, regenerative power generation can be performed in accordance with the condition of the vehicle.

Hence, in this embodiment, acceleration or deceleration of the vehicle is predicted by determining the possibility of accelerator pedal depression on the basis of the magnitude of the brake fluid pressure. In so doing, the allowable power generation amount of the power generator 21 is set at a value that does not impair the acceleration performance of the vehicle before the vehicle actually accelerates. Further, regenerative power generation can be performed in accordance with the deceleration of the vehicle.

(Second Embodiment)

Figure 7:
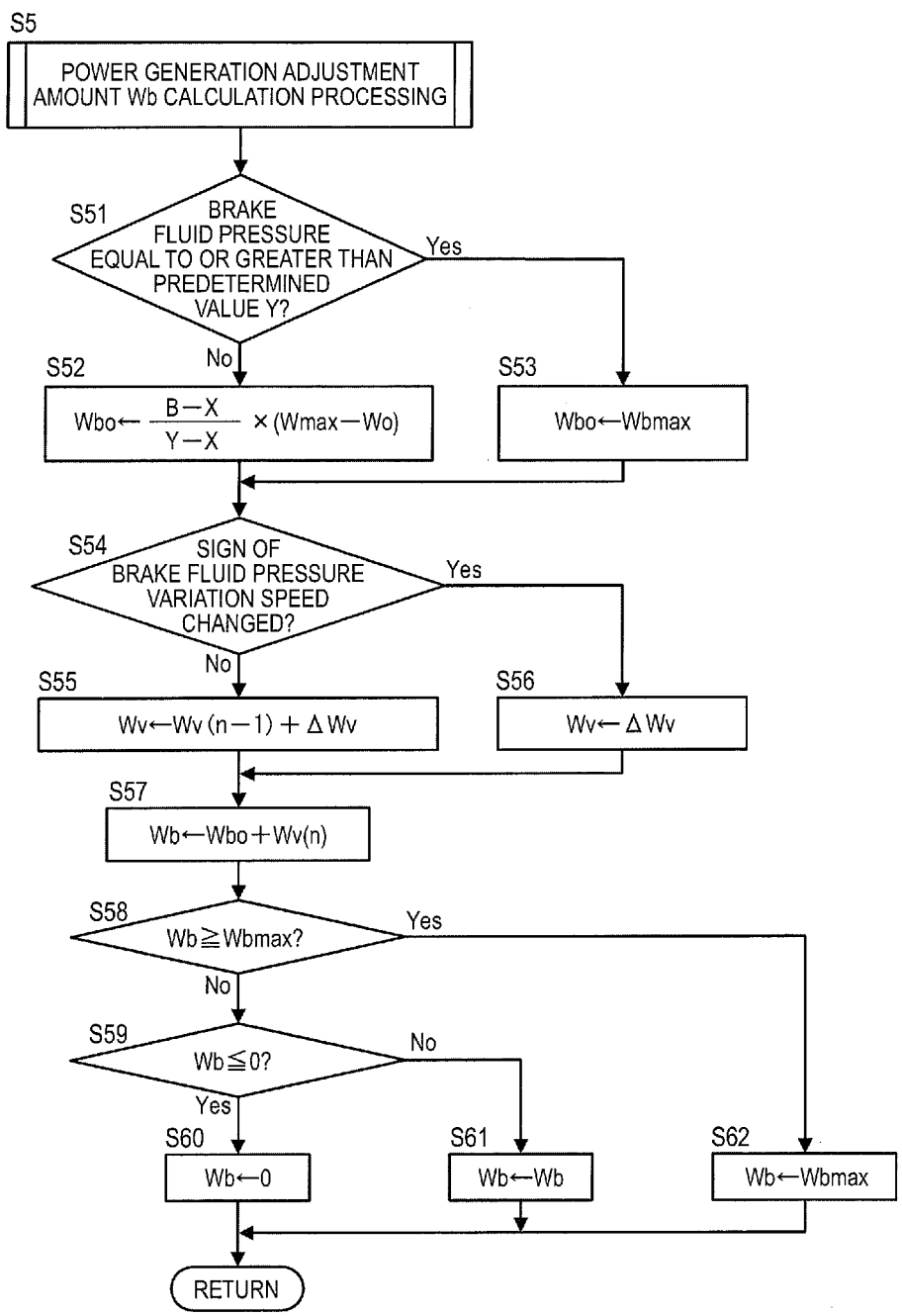
FIG. 7 is a flowchart illustrating a processing operation for calculating the power generation adjustment amount Wb according to a second embodiment.

FIG. 7 is a flowchart illustrating a processing operation for calculating the power generation adjustment amount Wb according to a second embodiment.

The second embodiment differs from the first embodiment in the processing method for calculating the power generation adjustment amount Wb (S5). In the first embodiment, the allowable power generation amount of the power generator 21 is set in accordance with the brake fluid pressure. In the second embodiment, a variation speed of the brake fluid pressure is also taken into account.

In the step S51, the power generation control device 100 for a vehicle determines whether or not the brake fluid pressure equals or exceeds the predetermined value Y. When the brake fluid pressure is smaller than the predetermined value Y, the power generation control device 100 for a vehicle advances the processing to the step S52. When the brake fluid pressure equals or exceeds the predetermined value Y, the power generation control device 100 for a vehicle advances the processing to the step S53.

In the step S52, the power generation control device 100 for a vehicle calculates a basic power generation adjustment amount Wbo corresponding to the brake fluid pressure. Here, an equation for calculating the basic power generation adjustment amount Wbo is similar to Equation (1) of the first embodiment.

In the step S53, the power generation control device 100 for a vehicle calculates the basic power generation adjustment amount Wbo corresponding to the brake fluid pressure. Here, an equation for calculating the basic power generation adjustment amount is similar to Equation (2) of the first embodiment.

In a step S54, the power generation control device 100 for a vehicle determines whether or not a sign of the brake fluid pressure variation speed has changed. When the sign of the brake fluid pressure variation speed has not changed, the power generation control device 100 for a vehicle advances the processing to a step S55. When the sign of the brake fluid pressure variation speed has changed, the power generation control device 100 for a vehicle advances the processing to a step S56.

In the step S55, the power generation control device 100 for a vehicle determines a power generation adjustment amount current value Wv corresponding to the brake fluid pressure variation speed by adding a variation amount $\Delta Wv$ to a power generation adjustment amount previous value Wv (n−1). In other words, the power generation adjustment amount Wv corresponding to the brake fluid pressure variation speed is calculated from a following Equation (3).

[Equation 3]

$$Wv = Wv(n-1) + \Delta Wv \tag{3}$$

Here, the variation amount $\Delta Wv$ is calculated from a following Equation (4) using a brake fluid pressure variation speed v and a coefficient k. It should be noted that the coefficient k varies in accordance with the sign of the brake fluid pressure variation speed. This will be described in detail below.

[Equation 4]

$$\Delta Wv = k \times v \tag{4}$$

In the step S56, the power generation control device 100 for a vehicle calculates the power generation adjustment amount Wv corresponding to the brake fluid pressure variation speed from a following Equation (5). The variation amount $\Delta Wv$ is calculated from Equation (4).

[Equation 5]

$$Wv = \Delta Wv \tag{5}$$

In a step S57, the power generation control device 100 for a vehicle calculates the power generation adjustment amount Wb from a following Equation (6).

[Equation 6]

$$Wb = Wbo + Wv \tag{6}$$

In a step S58, the power generation control device 100 for a vehicle determines whether or not the power generation adjustment amount Wb equals or exceeds the maximum power generation adjustment amount Wbmax. As described above, the maximum power generation adjustment amount Wbmax takes a value obtained by subtracting the basic power generation amount Wo from the maximum power generation amount Wmax. When the power generation adjustment amount Wb equals or exceeds the maximum power generation adjustment amount Wbmax, the power generation control device 100 for a vehicle advances the processing to a step S62. When the power generation adjustment amount Wb is smaller than the maximum power generation adjustment amount Wbmax, the power generation control device 100 for a vehicle advances the processing to a step S59.

In the step S59, the power generation control device 100 for a vehicle determines whether or not the power generation adjustment amount Wb is equal to or smaller than zero. When the power generation adjustment amount Wb is equal to or smaller than zero, the power generation control device 100 for a vehicle advances the processing to a step S60. When the power generation adjustment amount Wb is positive, the power generation control device 100 for a vehicle advances the processing to a step S61.

In the step S60, the power generation control device 100 for a vehicle sets the power generation adjustment amount Wb at zero.

In the step S61, the power generation control device 100 for a vehicle does not update the power generation adjustment amount Wb.

In the step S62, the power generation control device 100 for a vehicle sets the power generation adjustment amount Wb at the maximum power generation adjustment amount Wbmax.

Figure 8:
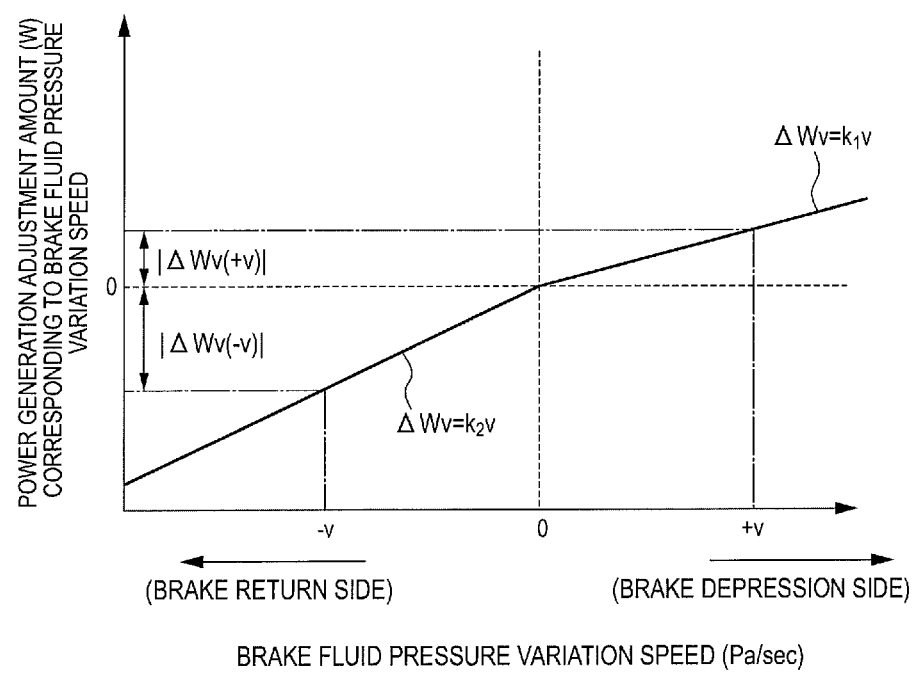
FIG. 8 is a view showing a relationship between a brake fluid pressure variation speed and the power generation adjustment amount.

FIG. 8 is a view showing a relationship between the brake fluid pressure variation speed and the power generation adjustment amount.

Here, referring to FIG. 8, the variation amount ΔWv corresponding to the brake fluid pressure variation speed will be described. The variation amount ΔWv of the step S55 or the step S56 may be determined from FIG. 8.

An abscissa in FIG. 8 shows the brake fluid pressure variation speed, and an ordinate shows the power generation adjustment amount. The brake fluid pressure variation speed is commensurate with the power generation adjustment amount.

When the brake fluid pressure variation speed is positive, or in other words when the brake pedal 41 is depressed, the power generation adjustment amount is positive. When the brake fluid pressure variation speed is negative, or in other words when the brake pedal 41 is returned, the power generation adjustment amount is negative. When the brake fluid pressure variation speed is zero, or in other words when the brake pedal 41 is held in a fixed position, the power generation adjustment amount is zero. Further, the power generation adjustment amount increases as the brake fluid pressure variation speed increases.

In this embodiment, an incline k2 obtained at a negative brake fluid pressure variation speed is larger than an incline k1 obtained at a positive brake fluid pressure variation speed.

With this setting, the power generation adjustment amount is smaller on a depression side than a return side even when the brake fluid pressure variation speed remains constant. In other words, "|ΔWv(+v)|<|ΔWv(−v)|" is established.

Figure 9:
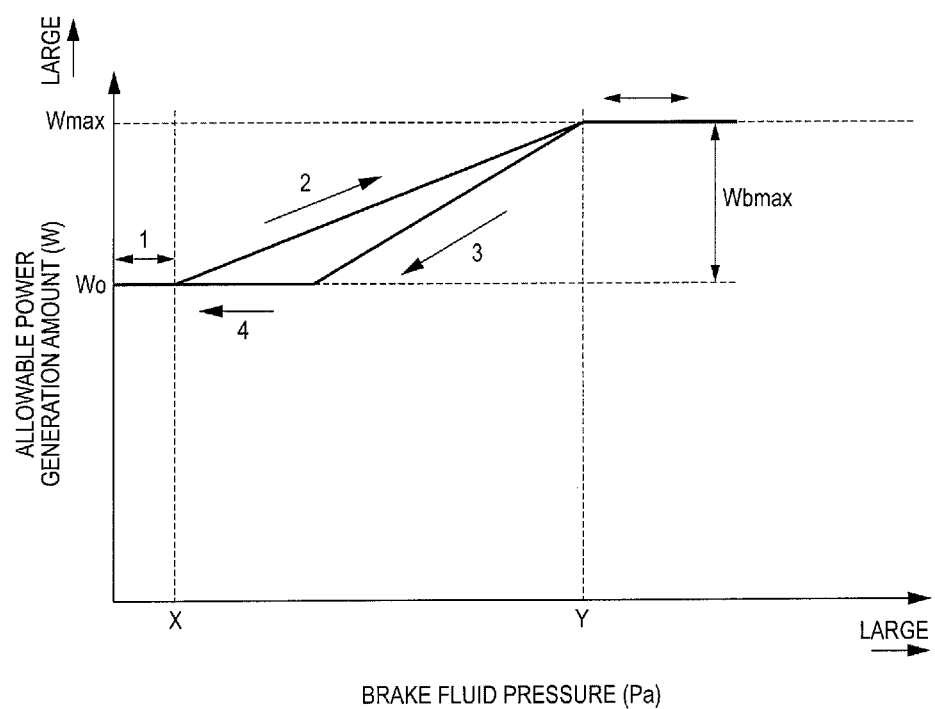
FIG. 9 is a view showing the relationship between the brake fluid pressure and the allowable power generation amount according to the second embodiment.

FIG. 9 is a view showing the relationship between the brake fluid pressure and the allowable power generation amount according to this embodiment.

The allowable power generation amount remains at the basic power generation amount Wo until the brake fluid pressure reaches the predetermined value X (arrow 1). When the brake fluid pressure exceeds the predetermined value X and continues to increase, the allowable power generation amount also increases. When the brake fluid pressure increases beyond the predetermined value Y, the allowable power generation amount reaches the maximum power generation amount Wmax (arrow 2). Thereafter, the allowable power generation amount decreases as the brake fluid pressure decreases (arrow 3). The allowable power generation amount reaches the basic power generation amount Wo before the brake fluid pressure reaches the predetermined value X. When the brake fluid pressure decreases thereafter, the allowable power generation amount remains at the basic power generation amount Wo (arrow 4).

As a result, when the brake fluid pressure shows a decreasing tendency, the allowable power generation amount decreases quickly in preparation for vehicle acceleration.

Figure 10:
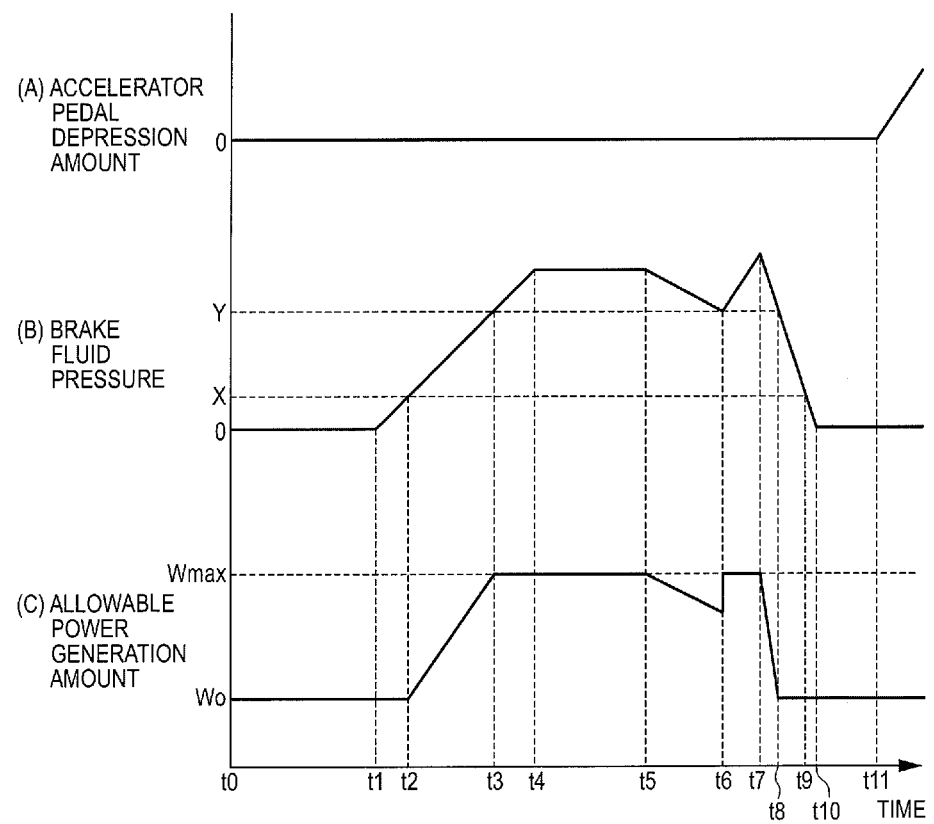
FIG. 10 is a time chart illustrating an operation of the power generation control device for a vehicle according to the second embodiment.

FIG. 10 is a time chart illustrating an operation of the power generation control device for a vehicle according to this embodiment.

Next, an operation according to this embodiment will be described with reference to FIG. 10.

From a time t0 to a time t1, the accelerator pedal depression amount and the brake fluid pressure are both zero (FIGS. 10A and 10B). At this time, the processing of S1→S2→S7 is repeated such that the allowable power generation amount of the power generator 21 is maintained at the basic power generation amount Wo (FIG. 10C).

From the time t1 to a time t2, the brake pedal 41 is depressed such that the brake fluid pressure increases but remains below the predetermined value X (FIG. 10B). At this time, the processing of S1→S2→S3→S4→S7 is repeated such that the allowable power generation amount of the power generator 21 is maintained at the basic power generation amount Wo (FIG. 10C).

At the time t2, the brake fluid pressure reaches the predetermined value X (FIG. 10B). Here, the processing of S1→S2→S3→S4→S51→S52→S54→S55→S57→S58→S59→S61→S6 is repeated, whereby the allowable power generation amount of the power generator 21 increases in accordance with the brake fluid pressure (FIG. 10C).

At a time t3, the brake fluid pressure reaches the predetermined value Y. Further, from the time t3 onward, the brake fluid pressure continues to increase (FIG. 10B). At this time, the processing of S1→S2 →S3→S4→S51→S53→S54→S55→S57→S58→S62→S6 is repeated, whereby the allowable power generation amount of the power generator 21 reaches the maximum power generation amount Wmax (FIG. 10C). The allowable power generation amount remains unchanged even when the brake fluid pressure exceeds the predetermined value Y.

At a time t4, the brake fluid pressure becomes constant (FIG. 10B). Here, the processing of S1→S2→S3→S4→S51→S53→S54→S55→S57→S58→S62→S6 is repeated. Since the brake fluid pressure is larger than the predetermined value Y, the allowable power generation amount remains at the maximum power generation amount Wmax (FIG. 10C).

At a time t5, the brake fluid pressure begins to decrease (FIG. 10B). Here, the processing of S1→S2→S3→S4→S51→S53→S54→S56→S57→S58→S59→S61→S6 is repeated. Since the brake fluid pressure is equal to or greater than the predetermined value Y but shows a decreasing tendency, the allowable power generation amount decreases (FIG. 10C).

At a time t6, the brake fluid pressure begins to increase again (FIG. 10B). Here, the processing of S1→S2→S3→S4→S51→S53→S54→S56→S57→S58→S62→S6 is repeated. The brake fluid pressure increases to or above the predetermined value Y, and therefore the allowable power generation amount returns to the maximum power generation amount Wmax (FIG. 10C).

At a time t7, the brake fluid pressure begins to decrease rapidly (FIG. 10B). Here, the processing of S1→S2→S3→S4→S51→S53→S54→S56→S57→S58→S59→S61→S6 is repeated. The allowable power generation amount also decreases rapidly in accordance with the brake fluid pressure (FIG. 10C).

At a time t8, the brake fluid pressure reaches the predetermined value Y and decreases further therefrom (FIG. 10B). Here, the processing of S1→S2→S3→S4→S51→S52→S54→S55→S57→S58→S59→S60→S6 is repeated. The allowable power generation amount also decreases rapidly in accordance with the brake fluid pressure (FIG. 10C). At the time t8, the allowable power generation amount reaches the basic power generation amount Wo, and since the brake fluid pressure decreases thereafter while remaining at or above the predetermined value X, the allowable power generation amount remains at the basic power generation amount Wo (FIG. 10C).

At a time t9, the brake fluid pressure reaches the predetermined value X and decreases further therefrom (FIG. 10B). Here, the processing of S1→S2→S3→S4→S7 is repeated. The allowable power generation amount remains at the basic power generation amount Wo (FIG. 10C).

At a time t10, the brake fluid pressure reaches zero (FIG. 10B). Here, the processing of S1→S2→S7 is repeated. The allowable power generation amount remains at the basic power generation amount Wo (FIG. 10C).

At a time t11, the accelerator pedal is depressed (FIG. 10A) while the brake fluid pressure remains constant at zero (FIG. 10B). Here, the processing of S1→S7 is repeated. The allowable power generation amount remains at the basic power generation amount Wo (FIG. 10C).

In the power generation control device 100 for a vehicle according to this embodiment, when the brake fluid pressure equals or exceeds the predetermined value X, the allowable power generation amount is increased as an increase speed of the brake fluid pressure rises. In this case, it can be determined that the vehicle is decelerating and there is no possibility of acceleration. In such cases, therefore, the power generation amount is increased early so that a large amount of regenerative power can be generated.

On the other hand, the allowable power generation amount is reduced as a reduction speed of the brake fluid pressure rises. In this case, it can be determined that the vehicle may accelerate. At this time, the power generation amount is reduced as the reduction speed of the brake fluid pressure rises, without waiting for the value of the brake fluid pressure to decrease, and therefore problems can be prevented from occurring in the auxiliary belt 4 even when the driver depresses the accelerator pedal rapidly after releasing the brake pedal.

The power generation adjustment amount on the depression side is smaller than the power generation adjustment amount on the return side even when the brake fluid pressure variation speed remains constant. In other words, "|ΔWv(+v)<ΔWv(−v)|" is established.

With this configuration, the power generation amount of the power generator 21 has already been reduced sufficiently when the vehicle is accelerated immediately after the brake fluid pressure begins to decrease, and therefore problems such as slippage and squeaking can be prevented from occurring in the auxiliary belt 4.

Further, in the power generation control device 100 for a vehicle, a time delay occurs from a point at which the engine controller 10 issues a command for limiting the allowable power generation amount to a point at which the power generator 21 actually generates the commanded allowable power generation amount. In this case, the allowable power generation amount can be reduced with sufficient leeway by increasing an amount by which the power generation adjustment amount is reduced relative to the reduction speed of the brake fluid pressure. Hence, even when the accelerator pedal is depressed before the allowable power generation amount is reduced on the basis of the command from the engine controller 10, the allowable power generation amount can be reduced sufficiently in advance, and therefore the load exerted on the auxiliary belt 4 does not become excessive. As a result, problems such as slippage and squeaking can be prevented from occurring in the auxiliary belt 4.

(Third Embodiment)

Figure 11:
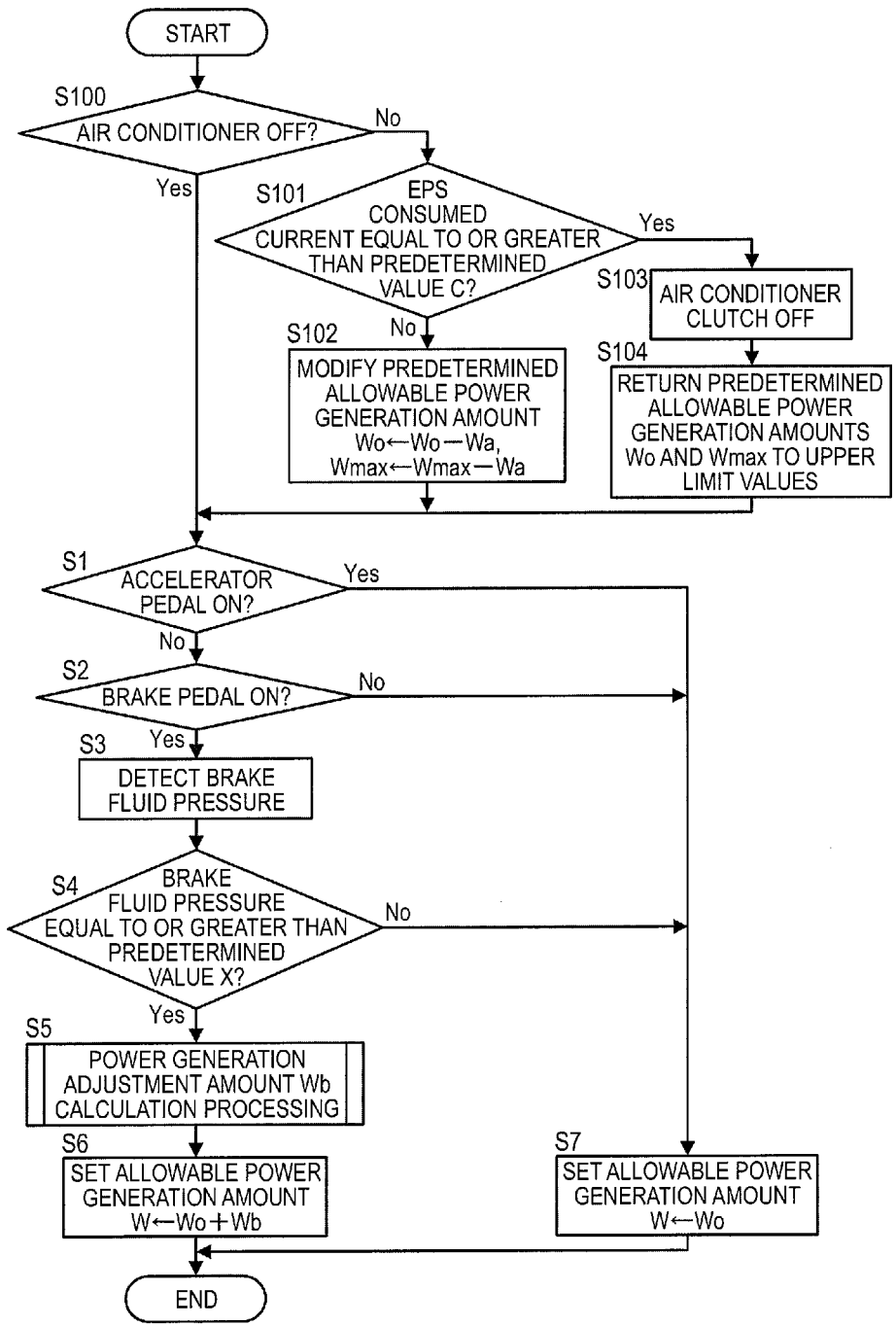
FIG. 11 is a flowchart illustrating an operation of a power generation control device for a vehicle according to a third embodiment.

FIG. 11 is a flowchart illustrating an operation of a power generation control device for a vehicle according to a third embodiment.

The third embodiment differs from the first embodiment and the second embodiment in that operations of the air conditioner compressor 31 and the electric power steering (EPS hereafter) 51 are taken into account in addition to the power generator 21.

In this embodiment, control of steps S100 to S104 is introduced before the step S1 of the flowcharts illustrating the operations of the power generation control devices for a vehicle according to the first and second embodiments. It should be noted that in the following description, parts exhibiting similar functions to the content described above have been allocated identical reference symbols, and duplicate description thereof has been omitted where appropriate.

In a step S100, the power generation control device 100 for a vehicle determines whether or not the air conditioner is OFF. When the air conditioner is OFF, the power generation control device 100 for a vehicle advances the processing to the step S1. When the air conditioner is not OFF, i.e. when the air conditioner is ON, the power generation control device 100 for a vehicle advances the processing to a step S101.

In the step S101, the power generation control device 100 for a vehicle determines whether or not an EPS consumed current is equal to or greater than a predetermined value C. When the EPS consumed current is smaller than the predetermined value C, the power generation control device 100 for a vehicle advances the processing to a step S102. When the EPS consumed current is equal to or greater than the predetermined value C, the power generation control device 100 for a vehicle advances the processing to a step S103.

In the step S102, the power generation control device 100 for a vehicle modifies a maximum value of a predetermined allowable power generation amount of the power generator 21. Heretofore, the basic power generation amount Wo has been used as the allowable power generation amount when the brake fluid pressure is smaller than the predetermined value X, but now a value obtained by subtracting a power generation adjustment amount Wa corresponding to an air conditioner torque from an upper limit value is set as a new basic power generation amount Wo. Further, a maximum possible power generation amount of the power generator 21 has been used as the maximum power generation amount Wmax when the brake fluid pressure equals or exceeds the predetermined value X, but now a value obtained by subtracting the power generation adjustment amount Wa corresponding to the air conditioner torque is set as a new maximum power generation amount Wmax. The power generation adjustment amount Wa will be described below.

In a step S103, the power generation control device 100 for a vehicle switches the air conditioner clutch 32 OFF. As a result, the air conditioner compressor 31 is stopped.

In a step S104, the power generation control device 100 for a vehicle returns the maximum power generation amount Wmax and basic power generation amount Wo of the power generator 21, modified in the step S102, to the upper limit values.

Figure 12:
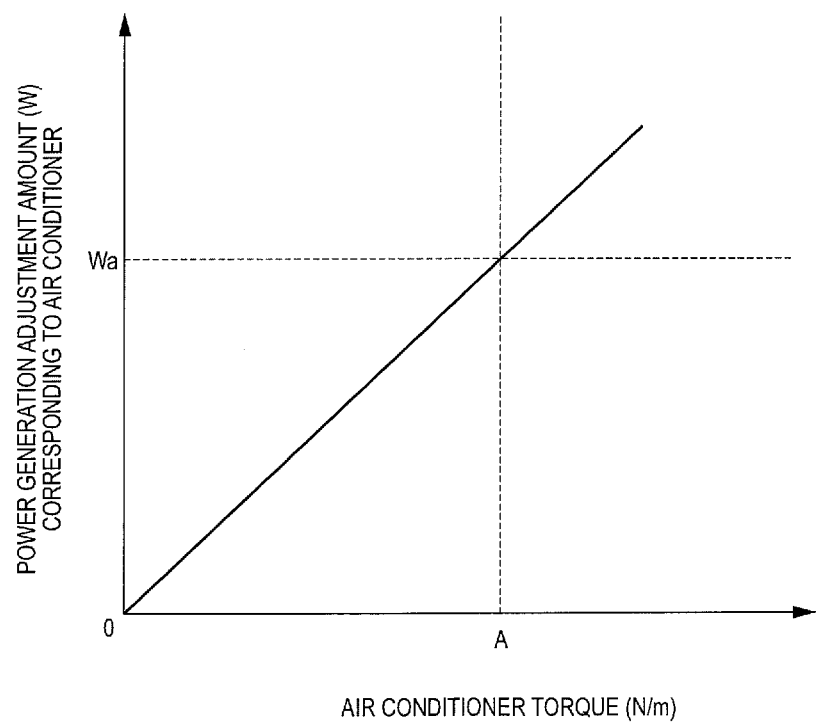
FIG. 12 is a view showing a relationship between an air conditioner torque and a power generation adjustment amount corresponding to an air conditioner.

Referring to FIG. 12, the power generation adjustment amount Wa will be described. FIG. 12 is a view showing a relationship between the air conditioner torque and the power generation adjustment amount corresponding to the air conditioner.

An abscissa in FIG. 12 shows the air conditioner torque, and the ordinate shows the power generation adjustment amount corresponding to the air conditioner torque. The air conditioner torque is commensurate with the power generation adjustment amount. When the air conditioner torque is zero, the power generation adjustment amount is also zero. The power generation adjustment amount increases as the air conditioner torque increases.

Hence, by subtracting the power generation adjustment amount Wa corresponding to the air conditioner torque from the maximum power generation amount Wmax of the power generator 21 when the air conditioner is operative, a total load on the power generator 21 and the air conditioner compressor 31 remains constant.

Figure 13:
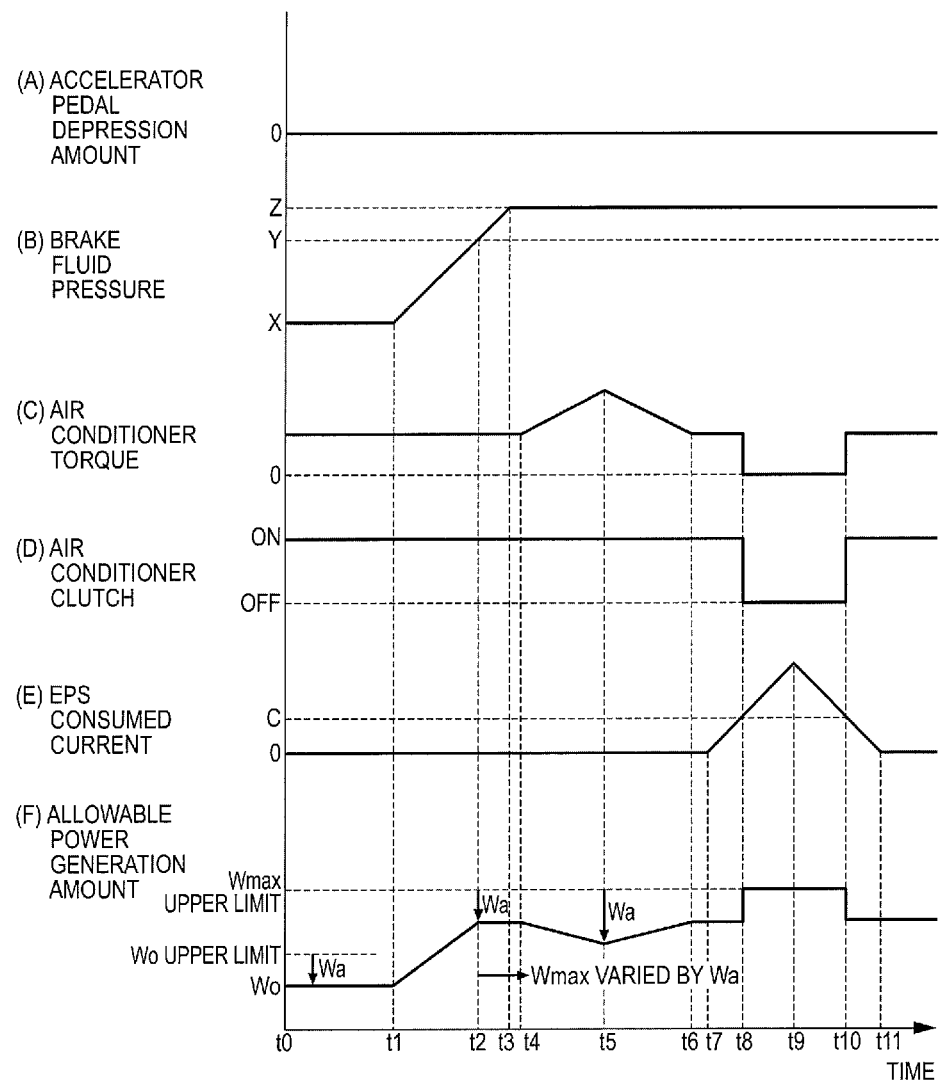
FIG. 13 is a time chart illustrating the operation of the power generation control device for a vehicle according to the third embodiment.

FIG. 13 is a time chart illustrating an operation of the power generation control device for a vehicle according to this embodiment.

Next, referring to FIG. 13, an operation according to this embodiment will be described.

From a time t0 to a time t1, the brake fluid pressure remains constant at the predetermined value X (FIG. 13B). Since the brake pedal 41 remains depressed at all times, the accelerator pedal depression amount is zero (FIG. 13A). The air conditioner is in use, and therefore the air conditioner clutch 32 is ON. The air conditioner torque is constant (FIGS. 13C and 13D). The electric power steering is not in use, and therefore the EPS consumed current is zero (FIG. 13E). The basic power generation amount Wo at this time takes the value obtained by subtracting the power generation adjustment amount Wa corresponding to the air conditioner torque from the upper limit value (FIG. 13F). Since the brake fluid pressure is at the predetermined value X, the allowable power generation amount corresponds to the basic power generation amount Wo. At this time, the processing of S100→S101→S102→S1→S2→S3→S4→S5→S6 is repeated.

At the time t1, the brake fluid pressure begins to increase gradually (FIG. 13B). Here, the processing of S100→S101→S102→S1→S2→S3→S4→S5→S6 is repeated. The allowable power generation amount rises in accordance with the increase in the brake fluid pressure (FIG. 13F).

At a time t2, the brake fluid pressure reaches the predetermined value Y, and continues to increase therefrom up to a time t3 (FIG. 13B). Here, the processing of S100→S101→S102→S1→S2→S3→S4→S5→S6 is repeated. Since the brake fluid pressure has reached the predetermined value Y, the allowable power generation amount remains constant at the maximum power generation amount Wmax. The maximum power generation amount Wmax at this time takes the value obtained by subtracting the power generation adjustment amount Wa corresponding to the air conditioner torque from the upper limit value (FIG. 13F).

At the time t3, the brake fluid pressure reaches and remains constant at Z (FIG. 13B). Accordingly, the processing of S100→S101→S102→S1→S2→S3→S4→S5→S6 is repeated. Since the brake fluid pressure and the air conditioner torque remain constant, the allowable power generation amount remains constant from the time t2 (FIG. 13F).

From a time t4 to a time t5, a further cooling request is issued and therefore the air conditioner torque increases (FIG. 13C). At this time, the processing of S100→S101→S102→S1→S2→S3→S4→S5→S6 is repeated. The power generation adjustment amount Wa increases in response to the increase in the air conditioner torque, and therefore the maximum power generation amount Wmax decreases (FIG. 13F). In other words, the allowable power generation amount decreases.

From the time t5 to a time t6, the air conditioner torque begins to decrease (FIG. 13C). At this time, the processing of S100→S101→S102→S1→S2→S3→S4→S5→S6 is repeated. The power generation adjustment amount Wa decreases in response to the reduction in the air conditioner torque, and therefore the maximum power generation amount Wmax increases (FIG. 13F). In other words, the allowable power generation amount increases.

From the time t6 onward, the air conditioner torque remains constant (FIG. 13C). Here, the processing of S100→S101→S102→S1→S2→S3→S4→S5→S6 is repeated. Since the brake fluid pressure and the air conditioner torque remain constant, the allowable power generation amount is maintained at the maximum power generation amount Wmax calculated at the time t6 (FIG. 13F).

From a time t7 to a time t8, the EPS 51 is operated such that the EPS consumed current increases (FIG. 13E). At this time, the processing of S100→S101→S102→S1→S2→S3→S4→S5→S6 is repeated. The EPS consumed current at this time does not exceed the predetermined value C, and therefore the allowable power generation amount is maintained as is (FIG. 13F).

At the time t8, the EPS consumed current exceeds the predetermined value C and increases further therefrom (FIG. 13E). When the EPS consumed current is large, the efficacy of the EPS 51 is prioritized, and therefore use of the air conditioner is stopped. In other words, the air conditioner clutch 32 is switched OFF (FIG. 13D). Since the air conditioner clutch 32 is switched OFF, the air conditioner compressor 31 stops, and therefore the air conditioner torque reaches zero (FIG. 13C). At the time t8, the processing of S100→S101→S103→S104→S1→S2→S3→S4→S5→S6 is executed. Then, the processing of S100→S1→S3→S4→S5→S6 is repeated. As a result, the power generation adjustment amount corresponding to the air conditioner torque reaches zero, and therefore the allowable power generation amount is set at the upper limit value of the maximum power generation amount Wmax, or in other words the maximum possible power generation amount of the power generator 21 (FIG. 13F).

At a time t9, the EPS consumed current reaches a maximum and begins to decrease (FIG. 13E). The air conditioner clutch 32 remains OFF while the EPS consumed current is large (FIG. 13D). Accordingly, the air conditioner torque remains at zero (FIG. 13C). Here, the processing of S100→S1→S3→S4→S5→S6 is repeated. As a result, the allowable power generation amount remains at the maximum possible power generation amount of the power generator 21 (FIG. 13F).

At a time t10, the EPS consumed current reaches the predetermined value C and decreases further therefrom (FIG. 13E). When the EPS consumed current falls to or below the predetermined value C, the power generation amount can be limited without affecting the efficacy of the EPS 51. Hence, use of the air conditioner is resumed such that the air conditioner clutch 32 switches ON. Further, the air conditioner compressor 31 is driven (FIG. 13D). Here, the processing of S100→S101→S102→S1→S2→S3→S4→S5→S6 is repeated. As a result, the allowable power generation amount is set at the value obtained by subtracting the power generation adjustment amount Wa corresponding to the air conditioner torque from the upper limit value of the maximum power generation amount Wmax (FIG. 13F).

At a time t11, the EPS consumed current becomes constant at zero (FIG. 13E). Likewise here, the processing of S100→S101→S102→S1→S2→S3→S4→S5→S6 is repeated, whereby the allowable power generation amount remains unchanged (FIG. 13F).

According to this embodiment, the load on the air conditioner compressor 31 is taken into account in addition to the power generator 21 as an auxiliary machine driven by a part of the power of the engine. To ensure that a total load on the auxiliary machines does not increase, when the air conditioner compressor 31 is driven, the allowable power generation amount of the power generator 21 is reduced in accordance with a resulting drive torque. In a case where the single auxiliary belt 4 is wrapped around a plurality of auxiliary machines, by limiting the total load on the auxiliary machines, the tension of the auxiliary belt 4 does not have to be designed to be capable of withstanding a sum of maximum drive torques of the respective auxiliary machines. As a result, the tension of the auxiliary belt 4 can be reduced, leading to an improvement in the fuel efficiency of the vehicle.

Further, while the current consumed by the EPS, which is driven by the power generator 21, is equal to or greater than the predetermined value C, the power generation control device 100 for a vehicle stops the air conditioner compressor 31. As a result, the power generation adjustment amount Wa reduced in accordance with the air conditioner torque reaches zero such that the allowable power generation amount increases. If the allowable power generation amount is suppressed during use of the EPS, the driver may be unable to obtain a sense of the efficacy of the EPS, causing a steering wheel to feel heavy when turned. Hence, by stopping the air conditioner compressor 31 when the consumed current of the EPS is large, the power generation control device 100 for a vehicle can increase the allowable power generation amount of the power generator 21 without increasing the total load on the auxiliary machines, and as a result, a deficiency in the efficacy in the EPS can be prevented.

This invention was described above through specific embodiments, but the invention is not limited to these embodiments, and various amendments or modifications may be added to the embodiment by a person skilled in the art within the technical scope of the invention.

For example, in the embodiments, the power generation control device 100 for a vehicle executes control on the basis of the brake fluid pressure, but similar effects are obtained when the depression amount or a depression force of the brake pedal is used instead of the brake fluid pressure. Further, in the second embodiment, the power generation adjustment amount corresponding to the brake fluid pressure variation speed is added to the power generation adjustment amount corresponding to the brake fluid pressure, but the power generation adjustment amount may be calculated from the brake fluid pressure variation speed alone. Similar effects are obtained as long as the power generation adjustment amount is increased as the brake fluid pressure increase speed increases and the power generation adjustment amount is reduced as the brake fluid pressure reduction speed increases. Furthermore, the air conditioner compressor is taken into account as an auxiliary machine of the engine in addition to the power generator, but this invention is not limited thereto, and similar effects are obtained by taking into account the load on an auxiliary machine connected to the engine by a single auxiliary belt together with the power generator.

Further, the power generator may be an alternator, a generator, or a dynamo.

With respect to the above description, the contents of Japanese Patent Application No. 2010-124236, with a filing date of May 31, 2010, are incorporated herein by reference.

The invention claimed is:

1. A power generation control device for a vehicle, which controls a power generator driven by a power of an engine, comprising:
   a brake operation amount detection unit that detects a brake operation amount; and
   a power generation amount setting unit that sets a power generation amount of the power generator to be lower when the vehicle is predicted to accelerate in accordance with the brake operation amount.

2. The power generation control device for a vehicle as defined in claim 1, wherein, at a constant brake operation amount, the power generation amount setting unit sets the power generation amount of the power generator when a brake pedal is returned to be smaller than the power generation amount of the power generator when the brake pedal is depressed.

3. The power generation control device for a vehicle as defined in claim 2, wherein the power generation amount setting unit increases the power generation amount of the power generator as a depression speed of the brake pedal increases, and reduces the power generation amount of the power generator as a return speed of the brake pedal increases.

4. The power generation control device for a vehicle as defined in claim 3, wherein the power generation amount setting unit increases the power generation amount of the power generator as the depression speed of the brake pedal increases, and
   when absolute value of the depression speed of the brake pedal and an absolute value of the return speed of the brake pedal are compared under equal conditions, an amount by which the power generation amount of the power generator is reduced in accordance with the return speed of the brake pedal is larger than an amount by which the power generation amount of the power generator is increased in accordance with the depression speed of the brake pedal.

5. The power generation control device for a vehicle as defined in claim 1, further comprising a total load adjustment unit that limits a total load on the power generator and an auxiliary machine driven by the power of the engine by reducing the power generation amount of the power generator as a load on the auxiliary machine increases.

6. The power generation control device for a vehicle as defined in claim 5, further comprising an air conditioner temporary stopping unit that temporarily stops an air conditioner compressor when a current value required by an electric power steering equals or exceeds a predetermined current value,
   wherein the total load adjustment unit removes the limit when the air conditioner temporary stopping unit is activated.

7. A power generation control method for a vehicle, in which a power generation amount of a power generator driven by a power of an engine is controlled, comprising:
    a step of detecting a brake operation amount; and
    a step of setting the power generation amount of the power generator to be lower when the vehicle is predicted to accelerate in accordance with the brake operation amount.

\* \* \* \* \*